Dec. 7, 1965 F. NESH 3,222,264
METHOD OF DETERMINING THE CHLORIDE ION CONCENTRATION IN WATER
Filed April 25, 1960 2 Sheets-Sheet 1

INVENTOR.
FLORENCE NESH
BY
Max A. Farmer
ATTORNEYS

Dec. 7, 1965   F. NESH   3,222,264
METHOD OF DETERMINING THE CHLORIDE ION CONCENTRATION IN WATER
Filed April 25, 1960   2 Sheets-Sheet 2

INVENTOR.
FLORENCE NESH
BY
Max A. Farmer
ATTORNEYS

United States Patent Office 3,222,264
Patented Dec. 7, 1965

3,222,264
METHOD OF DETERMINING THE CHLORIDE ION CONCENTRATION IN WATER
Florence Nesh, 164 Hart St., Brooklyn, N.Y.
Filed Apr. 25, 1960, Ser. No. 24,629
12 Claims. (Cl. 204—1)
(Granted under Title 35, U.S. Code (1952), sec. 266)

The invention described herein may be manufactured and used by or for the Government of the United States of America for governmental purposes without the payment of any royalties thereon or therefor.

This invention relates to the determination of the chloride ion concentration in water, even where the concentration may be below 1 part chloride per million parts of water.

The determination of the chloride ion concentration in water has become of increasing importance, and heretofore no simple, rapid and satisfactory procedure has been known for determining the presence of even minute amounts of chloride ions in water. In nuclear reactor systems, for example, it is necessary that the reactor cooling water be subtantially or entirely free of chloride ions. The chloride ions can become radioactive and when they do, they are gamma ray emitters which may create a personnel hazard, so one must be able to ascertain whether the reactor cooling water is free of chloride ions. In other systems, it is also desirable to test water for the presence of chlorides therein, even up to 14 parts per million. There are also other instances where the water should be substantially free of chloride ions.

An object of this invention is to provide a relatively simple, practical, rapid, efficient and inexpensive method for determining the chloride ion concentration in water, which will be accurate and practical for water in which the chloride ion concentration may be less than 1 part per million of water, which may be performed easily and successfully by technicians of limited skill and experience, and which uses relatively simple and inexpensive apparatus.

Other objects and advantages will be apparent from the following description of one example of the invention, and the novel features will be particularly pointed out hereinafter in connection with the appended claims.

Figure 1:
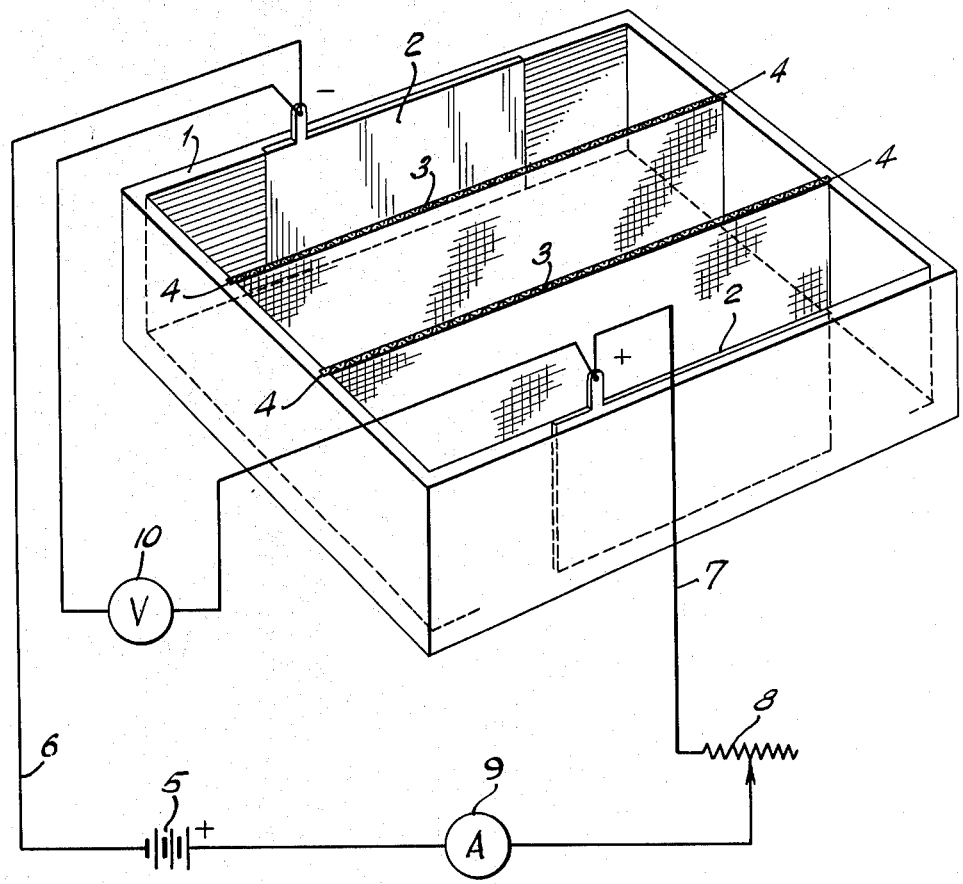
Figure 2:
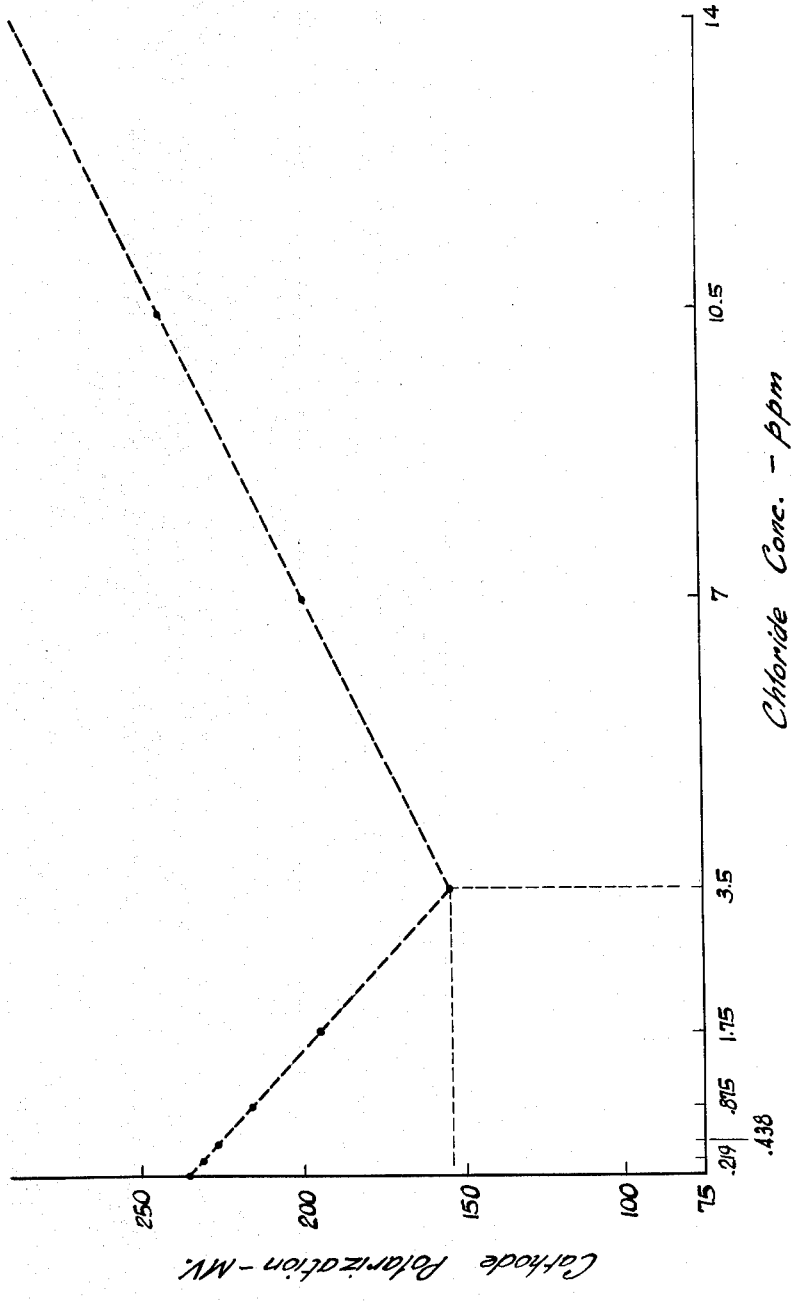

In the accompanying drawing:

FIGURE 1 is a schematic illustration of an electrolytic cell and its connections which may be successfully employed in the practice of the invention; and FIGURE 2 is a diagram illustrating a type of graph chart which may be created as a part of the improved method.

In the apparatus illustrated in the drawing, as one example that may be employed in the practice of the invention, an open topped container 1 of any suitable electrically insulating rigid material, of which glass and Lucite (polymerized methyl methacrylate resin) are examples, is provided on its opposite inside walls with upright copper strips 2 arranged parallel with each other. These strips 2 are of the same face areas and preferably are recessed flush into the container side walls and cemented to the side walls so that only the faces will be exposed in the container. One or more sheets 3 of copper gauze may be disposed in the container, and they are parallel to and equally spaced from the electrodes 2 and from each other, and disposed in upright positions in planes normal to the direction of any current flow between the electrodes 2. For convenience the side walls of the container, on their inside faces, are provided with vertically extending slots 4 in which the ends of the gauze sheets 3 are slid to hold the sheets in upright, selected positions.

A source 5 of direct current is connected across the electrodes 2 by wires 6 and 7, and in one of these wires 6 and 7, a variable resistance 8 is included in series. A current measuring device 9, such as a milliammeter, is also included in series with one of the wires 6 and 7 to indicate the amount of current flowing through wires 6 and 7 at any time.

In the container, the circuit between wires 6 and 7 is completed through an electrolyte of known amount which is placed in the container. Such an electrolyte contains copper sulfate, water, sulfuric acid, and preferably a gelatine. One successful example of such an electrolyte solution is formed of 125 gms. of $$CuSO_4 \cdot 5H_2O$$

per liter of deionized water, 100 gms. of $H_2SO_4$ per liter of such water, and 25 mg. of gelatin per liter.

A high impedance voltage measuring device 10, such as a vacuum tube voltmeter for example, is connected across the two electrodes 2 so as to measure the voltage between these electrodes while a current is flowing through the electrolyte. An electrolyte for use in the container is first made up of the deionized water, copper sulfate, sulfuric acid and gelatine, and to such an electrolyte solution, known amounts of a chloride, such as salt (NaCl), are added progressively in small amounts. A direct current of known voltage current relationship is passed through the electrolyte in the container, and preferably the voltage is varied through regulation of resistance 8 until a current of known uniform current density is flowing through the electrolyte. The voltage across the electrodes 2 is read, while the current is flowing through the electrolyte, when the first chloride was added, and after each further added amount of chloride. These voltages for different known amounts of added chloride are plotted as a graph 11 (FIGURE 2), the voltages being represented on the vertical ordinate and the amounts of added chloride on the horizontal ordinate. It will be found that in the graph the voltage will first decline with increasing amounts of added chloride until about 3.5 parts per million of added chloride are employed and then the voltages will thereafter rise with further added amounts of the chloride, at least until 14 parts of chloride per million parts of water have been reached. Instead of a graph, the voltages for varying amounts of added chloride may be tabulated.

To determine the chloride ion concentration in a suspect specimen or sample of water, one uses the same apparatus shown in FIG. 1, except that a new electrolyte is employed. This new electrolyte should be identical in composition with that used in preparing the graph or data described above, except that the suspect water is used in place of the deionized water, and no chlorides are added. When such an electrolyte is placed in the container 1 and the same current of the same voltage-current relationship as described above, is passed through the new electrolyte containing the suspect water, the voltage across the electrodes 2 will be measured or read. Then by comparing or matching such new voltage with the graph or tabulation, such as by locating this new voltage on the graph, one may by reference to this located voltage ascertain on the horizontal coordinate, the amount of the chloride in such suspect water.

Using the sample or suspect water to be examined, in making up the electrolyte, the presence of chloride ions in the suspect water will affect the cathode polarization as follows at 25° C. (or room temperature): (Room temperature) (current density=2 amp./dm.$^2$). From 0 to 3.5 parts per million of water, of chloride ion, the cathode polarization drops during uniform current density, with an increase in the chloride ion concentration.

From 3.5 and more parts per million of chloride ion concentration using the same uniform current density, the cathode polarization increases. Hence it is usually necessary to take 2 readings for the electrolyte using the suspect water. One first makes the reading in the manner described. Then the same electrolyte is materially diluted, such as by making a 15% dilution for example, and then another reading is taken. If the chloride ion concentration of the undiluted electrolyte is initially greater than 3.5 parts per million of electrolyte, the cathode polarization of the diluted electrolyte will go down. If the chloride ion concentration was initially less than 3.5 parts per million of electrolyte, then the cathode polarization of the same but diluted electrolyte will increase. This will indicate whether the initial voltage reading was on the first part of the graph from 0 to 3.5 parts per million or on the further part from 3.5 to 14 parts per million of the electrolyte.

The particular shape and size of the cell is not material. It is the well known Haring type of cell, and its geometry and size may be varied to suit the sample and the occasion. One could use a cell where one electrode, such as the anode for example, is the liner thereof and the other electrode, such as the cathode for example, is introduced as a probe.

Fresh water used as a coolant in nuclear reactors, and also in various water systems, should not have more than about 1 part per million of chloride ions in order to avoid material corrosion of the iron or steel of the system in which the water is confined. Even if the walls confining the water are of stainless steel, the chloride ion concentration should be kept below about 1 part per million for corrosion prevention. The copper gauze interponents 3 are chemically inactive in the electric circuit, and are not essential to the operativeness of the method. Their presence is believed to aid in the transfer of the copper ions in the electrolyte. Devices employing an ion exchange resin are available and in use to remove chlorides from water, but it is necessary to test the water so treated to remove chlorides, in order to be certain that the chloride ion concentration is below a desired limit.

The gelatine in the electrolyte is not absolutely essential to the success of the process, but it is very useful. It plates out on the surface of the electrode on which the copper is deposited and helps in keeping the plated surface smooth and even. The gelatine appears to have a stabilizing influence on the electric current or on the ion flow, but preferably it should not release ions when in solution. The particular amount of the gelatin can be varied and should be selected to give optimum results. Usually less than about 10% of the gelatine is satisfactory. One uses the minimum that will give optimum results. As examples of different forms of gelatine, may be mentioned regular gelatine, Russian glue, isinglass, casein (in ammonia), egg-globulin, ovomucoid, glycoprotein, amorphous and crystallized egg-albumin, fresh egg white, gum arabic and gum tragacanth. Broadly speaking, glue is impure gelatine and regular gelatine is preferred as the additive to the electrolyte. Glue and gelatines are especially powerful and typical protective colloids, even if present in minute quantity. If the strength of the electrolyte is changed, the optimum amount of gelatine may have to be redetermined.

It will be understood that various changes in the materials, steps and other details of the process, which have been herein described and illustrated in order to explain the nature of the invention may be made by those skilled in the art, within the principle and scope of the invention as expressed in the appended claims.

I claim:

1. The method for use in determining the chloride ion concentration in water where the concentration may be below 1 part per million, which comprises preparing a series of standard electrolyte test solutions containing copper sulphate, sulfuric acid, deionized water and a water soluble, colloidal, stabilizing agent, plus in each a very small amount of a water soluble, ionizable chloride, in different known amounts in different ones of such solutions, passing between spaced copper electrodes immersed individually in each of such solutions, a direct current of the same uniform current density, preparing a graph of the voltages between said electrodes in each of such solutions during the passage of such current, preparing an examination solution corresponding to one of the standard test solutions before any chloride was added and using water to be examined in place of the deionized water, passing an equivalent direct current of the same current density between similarly spaced copper electrodes immersed in said examination solution, then locating on said graph the point thereof corresponding to the voltage across said electrodes with said equivalent current, whereby the position on such graph of such point relatively to the concentration coordinate will indicate the concentration chloride in the water used in the examination solution.

2. The method for use in determining the chloride ion concentration in water where the concentration may be below 1 part per million, which comprises preparing a series of standard electrolyte test solutions containing copper sulphate, sulfuric acid and deionized water, plus in each, a very small amount of a water soluble, ionizable chloride, in different known amounts in different ones of such solutions, passing between spaced copper electrodes immersed individually in each of such solutions, a direct current of the same uniform current density, preparing a graph of the voltages between said electrodes in each of such solutions during the passage of such current, preparing an examination solution corresponding to one of the standard test solutions before any chloride was added and using water to be examined in place of the deionized water, passing an equivalent direct current of the same current density between similarly spaced copper electrodes immersed in said examination solution, then locating on said graph the point thereof corresponding to the voltage across said electrodes with said equivalent current, whereby the position on such graph of such point relatively to the concentration coordinate will indicate the concentration chloride in the water used in the examination solution.

3. The method according to claim 1, then materially diluting the examination solution, then passing said equivalent current through the diluted solution, and locating on the graph the point thereof corresponding to the voltage across said electrodes with said equivalent current through said diluted solution, whereby if the latest voltage on said chart has increased over the voltage on the first prepared examination solution, one knows that the latter is in the portion of the graph that decreases with an increase in the chloride content of the water used in preparing the said examination solution.

4. The method according to claim 2, then materially diluting the examination solution, then passing said equivalent current through the diluted solution, and locating on the graph the point thereof corresponding to the voltage across said electrodes with said equivalent current through said diluted solution, whereby if the latest voltage on said chart has increased over the voltage on the first prepared examination solution, one knows that the latter is in the portion of the graph that decreases with an increase in the chloride content of the water used in preparing the said examination solution.

5. The method according to claim 1, wherein said stabilizing agent is a gelatine.

6. The method according to claim 1, wherein the stabilizing agent is a gelatine and is less than about 10% by weight of the components added to the water.

7. The method according to claim 2, and interposing a sheet of copper gauze between, and spaced well from, said electrodes in said solutions.

8. The method for use in determining the chloride ion concentration in suspect water where such concentration may be below 1 part per million, which comprises preparing an electrolytic solution of suspect water containing said water, copper sulfate and sulfuric acid, passing between spaced copper electrodes, while they are in said solution, a direct current of known uniform relationship of density and voltage, indicating on an instrument the voltage across said electrodes while said current is flowing, preparing a plurality of similar solutions in which deionized water is used in place of the suspect water and different known amounts of a chloride are included, passing between similar and similarly placed copper electrodes, while immersed in said similar solutions, a direct current of the same uniform current voltage relationship, and indicating on an instrument the voltage between said similar electrodes while said current is flowing, whereby one may, by matching said voltage measured in the solution formed of the suspect water with the said voltages measured in the solutions using different known amounts of added chloride ions ascertain the amount of chloride ion concentration in the suspect water.

9. The method for use in determining the chloride ion concentration in suspect water where such concentration may be below 1 part per million which comprises preparing an electrolyte solution of suspect water containing said water, copper sulfate, and sulfuric acid, passing between spaced copper electrodes, while they are immersed in said solution, a direct current of known relationship of density to voltage across the electrodes, indicating on an instrument the voltage across said electrodes while said current is flowing, and similarly indicating on an instrument the voltages across said electrodes under similar current and voltage conditions while using similar solutions but using deionized water in place of suspect water and with different known chloride ion concentrations, whereby one, by matching the voltages across said electrodes while applying the same current density to voltage proportion, ascertains the concentration of chloride ions in the suspect water.

10. The method for use in determining the chloride ion concentration in suspect water where such concentration may be below one part per million, which comprises preparing an aqueous electrolyte solution containing copper sulfate, sulfuric acid and said suspect water, passing a direct current of known relationship of density to voltage through said electrolyte between spaced copper electrodes therein, connecting a voltmeter across said electrodes while said current is passing to indicate the then voltage fall between said electrodes, and also performing similar steps under a similar current density while using deionized water in a similar electrolyte instead of the suspect water, repeatedly with known and different amounts of added chloride ion concentrations, whereby one may, by physically comparing the voltage indicated when using an electrolyte containing the suspect water with the voltages indicated when using similar solutions containing deionized water with known and different chloride ion concentrations therein, ascertain the chloride ion concentration in the suspect water.

11. The method according to claim 10, and repeating the steps employing the suspect water substantially diluted by a known amount to enable one to decide whether the indicated voltages relate to chloride ion concentrations above or below about 3.5 parts per million.

12. The method according to claim 10, wherein a wall of copper gauze is interposed across the path of said current between said electrodes during the passage of such current while using the different electrolytes.

References Cited by the Examiner
UNITED STATES PATENTS

| | | | |
|---|---|---|---|
| 2,289,589 | 7/1942 | Pomeroy | 204—195 |
| 2,526,857 | 10/1950 | Chaney | 204—1.1 |
| 2,758,079 | 8/1956 | Eckfeldt | 204—195 |
| 2,838,233 | 6/1958 | Garrison | 204—195 |
| 2,844,532 | 7/1958 | White et al. | 204—1.1 |
| 2,870,077 | 1/1959 | Kushner | 204—195 |
| 2,912,367 | 11/1959 | Asendorf et al. | 204—1.1 |

JOHN H. MACK, *Primary Examiner.*

JOSEPH REBOLD, JOHN R. SPECK, *Examiners.*